3,804,926
POLYMERS HAVING IMPROVED EXTRUSION AND COLD-STRETCHING PROPERTIES AND METHOD AND COMPOSITION FOR OBTAINING SUCH POLYMERS

Eckhard C. A. Schwarz, Neenah, and Robert T. Kohl, Appleton, Wis., assignors to Kimberly-Clark Corporation, Neenah, Wis.
No Drawing. Continuation-in-part of abandoned application Ser. No. 78,624, Oct. 6, 1970. This application May 26, 1972, Ser. No. 257,430
Int. Cl. C08f 41/12
U.S. Cl. 260—897 A    8 Claims

ABSTRACT OF THE DISCLOSURE

Polymers having improved extrusion and cold-stretching properties are produced by melt-blending the polymer prior to extrusion with maleic anhydride and a compound having the structure

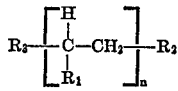

where $R_1$ = aromatic radical or substituted aromatic radical having a tertiary hydrogen in the $\alpha$ position to the benzene ring,
$R_2$ = $H_1$ or alkyl radical,
$R_3$ = $H_1$, aromatic or alkyl radical,
$n$ = 1–10,000.

---

This application is a continuation-in-part of Ser. No. 78,624 of Eckhard C. A. Schwartz and Robert T. Kohl, filed Oct. 6, 1970, and entitled "Polypropylene Having Improved Extrusion and Cold-Stretching Properties," now abandoned.

DESCRIPTION OF THE INVENTION

Our invention relates generally to a method of increasing the melt and solution viscosities of certain polymers to thereby produce a polymer having improved exrusion performance and physical properties. More particularly, our invention relates to the achievement of these benefits by melt-blending the polymer with maleic anhydride and a compound having a tertiary benzilic hydrogen atom. Films extruded from the mixture have higher melt viscosities than normally attributed to such polymers and may be cold-stretched at fast rates. As a result, the films obtained are stronger than those formed from unmodified polymers.

Propylene polymers, particularly polypropylene in its crystalline (isotactic) form, have been found to possess unique and useful properties for the formation of sheets and other extruded products. Such films find uses in shrink packaging and may be coated or laminated to form a heat sealable overwrap. It further can be formed into tubes for piping, fibers for synthetic fabrics, carpets, rope, etc., and molded to form parts for washing machines, televisions, etc. and articles such as luggage. In general, for applications where rigid or hard polymers are required, the average degree of crystallinity should be high. In its crystalline form polypropylene has excellent resistance to solvents, greases, and oils as well as acids, alkalies, and many other common chemicals.

Other properties generally attributed to polypropylene are high yield strength and rigidity, a high heat distortion temperature, good surface hardness and resistance to stress cracking. Its dielectric properties are excellent, and its impact resistance at normal temperatures is good although it tends to become brittle blow 25° C.

However, for certain applications such as blow film processes and cold-stretch processes, commercial propylene polymers have not been entirely satisfactory. A desirable property for these processes is the ability of a polymer to elongate rapidly without breaking. Absent this ability the time required for stretching the polymer may be undesirably extended.

It is, therefore, a primary object of our invention to provide polypropylene and certain other polymers having increased elongation at break.

It is further an object of our invention to provide such polymers that may be stretched at fast rates thus reducing the cost of this operation.

A related object of our invention is to provide a method for obtaining these polymers having the aforesaid advantageous properties.

Other objects and advantages will become apparent upon reference to the examples and detailed disclosure below.

In accordance with our invention the melt and solution viscosities of polymers having a minimum number of tertiary hydrogens are increased by melt blending therewith a minor proportion of maleic anhydride and a compound having a tertiary benzilic hydrogen atom. As earlier indicated, the resulting polymers possess improved extrusion performance and enhanced physical properties.

The following examples are included for the purpose of illustrating our invention, and it is not intended that it be limited thereto or in any manner except as indicated by the claims which conclude this disclosure. Proportions included herein are by weight unless otherwise noted.

EXAMPLE 1

This example demonstrates the process of our invention and the results which may be obtained. Three samples were prepared of varying compositions for comparison of inherent viscosity and melt index determinations. Inherent viscosity measurements are defined as the specific viscosity divided by the concentration and were obtained at 0.5% concentration in p-xylene at 100° C. using a Sargent Viscosimeter #50. Melt index tests were performed on two of the samples at 190° C. and 230° C. in accordance with ASTM Method #D–1238–65T using a 625 gram weight in a Tinius Olson melt indexer.

In carrying out this example isotactic polypropylene, commercial atactic polystyrene (Dow's Styron #685, melt flow of 2.4 g./10 minutes as measured in accordance with ASTM D–1238–62T), and maleic anhydride in a weight ratio of 40:2:1, respectively, were mixed intimately in powder form. A film was formed from this powder mixture by pressing a two-gram sample for two minutes at 200° C. and 30,0000 p.s.i. pressure. This film was identified as sample 1a.

Following the same procedure, a film was prepared from a powder mixture containing polypropylene, polystyrene, and maleic anhydride in a weight ratio of 100:2:1, respectively. This film was labeled sample 1b.

For comparison, sample 1c was prepared by pressing polypropylene, alone, in the manner used to form films 1a and 1b. Sample 1d was prepared by similarly pressing a film from a mixture of polypropylene and maleic anhydride in a weight ratio of 100:1, respectively. Two additional films were prepared in the same manner from mixtures of polypropylene and styrene in weight ratios of 40:2 and 100:2 respectively, and identified as samples 1e and 1f in the order of increasing polypropylene concentration.

Inherent viscosity determinations were carried out on each of the film samples 1a through 1f in p-xylene at 100° C. using a Sargent Viscosimeter #50. For samples 1b and 1c melt index determinations were also made at 190° C. and 230° C. using a 235 gram weight in a Tinius Olson melt indexer in accordance with ASTM Method #D-1238-65T. Table 1 summarizes this work.

TABLE 1

| Sample No. | Ratio PP/PS/MA | Inherent viscosity (spec. V.)/C | Melt index, g./10 min. at— 190° C. | 230° C. |
|---|---|---|---|---|
| 1a | 40/2/1 | 2.70 | | |
| 1b | 100/2/1 | 2.92 | 1.1 | 4.1 |
| 1c | 100/–/– | 1.56 | 1.8 | 13.9 |
| 1d | 100/–/1 | 0.72 | | |
| 1e | 40/2/– | 1.9 | | 6.6 |
| 1f | 100/2/– | 2.0 | | |

From the above it can be seen that the addition of a small amount of polystyrene to polypropylene increases the latter's melt and solution viscosity results only slightly while the addition of maleic anhydride to polypropylene has a drastic opposite effect. In contrast, the combination of small amounts of both polystyrene and maleic anhydride with polypropylene leads to a considerable increase in melt and solution viscosities.

EXAMPLE 2

In order to show that other aromatic compounds having a tertiary benzilic hydrogen atom may replace polystyrene in the formulations of our invention, films were formed from mixtures in the following proportions: polypropylene, cumene, and maleic anhydride in weight ratios of 40:2:1, respectively; polypropylene, m-di-isopropylbenzene, maleic anhydride in a weight ratio of 40:2:1, respectively; and polypropylene, 1,1-diphenylethane, maleic anhydride in a weight ratio of 40:2:1, respectively. Inherent viscosity results on these samples appear in Table 2.

TABLE 2

Sample: Inherent viscosity (as in Example 1)
1c ......................................... 1.56
2a (PP/cumene/MA: 40/2/1) ............. 2.43
2b (PP/m-di-isopropylbenzene/MA:40/2/1) .. 2.99
2c (PP/1,1-diphenylethane/MA:40/2/1) .... 2.5

From the results it is believed that the increase in inherent viscosity attributed to our invention is a general effect of the combination of maleic anhydride and a compound having the following structure:

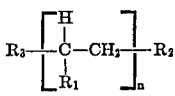

where $R_1$=an aromatic radical or substituted aromatic radical having a tertiary hydrogen in the $\alpha$ position to the benzene ring,
$R_2$=either an $H_1$ or an alkyl radical,
$R_3$=$H_1$, aromatic radical, or alkyl radical.

The value for $n$ may vary from 1 to up to about 10,000. Above that value the results are generally undesirable since melt viscosities become too high for convenient processing.

Furthermore, as shown by Table 2, the aromatic compound need not be a polymer to achieve our significant increase in solution viscosity over polypropylene alone.

EXAMPLE 3

Often when a substantial improvement in polymer properties is achieved by means of additives such as plasticizers, it is at the expense of a deterioration in other properties. In the case of our invention we have found no significant detrimental side effects on the physical properties of resulting films. To demonstrate that this is true, a ¼ inch by 2½ inch sample prepared in the manner of sample 1c, i.e., polypropylene alone, was elongated in an Instron tensile machine at a rate of 2 cm./minute. The sample did not "neck down" and broke at only 5.8% elongation. At a slow rate of 0.5 cm./minute "necking down" at room temperature did occur. The polymers of our invention, however, prepared in the manner of samples 1a and 1b could be stretched at a rate of 20 cm./minute to a final elongation at break of 700%. Yet the tensile properties of sample 1a as compared to those of sample 1c where cold drawn (by room temperature necking) showed only a small variation as indicated in Table 3.

TABLE 3

| Sample | Breaking strength (p.s.i.) | Initial modulus (p.s.i.) |
|---|---|---|
| 1a | 1,600 | 93,330 |
| 1c | 1,900 | 94,380 |

EXAMPLE 4

To demonstrate the applicability of the present invention for improving the properties of polymers other than polypropylene, low density polyethylene (Melt Index 6.5), polystyrene (Dow Styron 685), and maleic anhydride were mixed thoroughly in a weight ratio of 100/2/1, respectively and pressed into a film at 200° C. according to the method of Example 1. The resulting sample was labelled 4a. Control samples were prepared in the same manner except that 4b did not include maleic anhydride and 4c included neither maleic anhydride nor polystyrene. Inherent viscosity tests as described in Example 1 were carried out, and the results are set forth in Table 4.

TABLE 4

| Sample | Ratio LDPE/PS/MA | Inherent viscosity [1] |
|---|---|---|
| 4a | 100/2/1 | 2.35 |
| 4b | 100/2/– | 1.56 |
| 4c | 100/–/– | 1.46 |

[1] As in Example 1.

EXAMPLE 5

Example 4 was repeated substituting a crystalline high density polyethylene (Melt Index 6.0) for the low density polyethylene. The results shown in Table 5 that little effect was obtained indicate that the reaction leading to a higher molecular weight takes place at the tertiary carbon of the polyolefin.

TABLE 5

| Sample | Ratio HDPE/PS/MA | Inherent viscosity [1] |
|---|---|---|
| 5a | 100/2/1 | 1.80 |
| 5b | 100/2/– | 1.82 |
| 5c | 100/–/– | 1.76 |

[1] As in Example 1.

EXAMPLE 6

Example 4 was again repeated substituting an experimental random copolymer of 90% propylene and 10% ethylene units (Melt Index 6.0) for the low density polyethylene. In this case, as shown in Table 6, the increase in inherent viscosity was obtained indicating the beneficial results of the invention with copolymers.

TABLE 6

| Sample | Ratio copolymer/PS/MA | Inherent viscosity [1] |
|---|---|---|
| 6a | 100/2/1 | 2.90 |
| 6b | 100/2/– | 1.65 |
| 6c | 100/–/– | 1.50 |

[1] As in Example 1.

EXAMPLE 7

Example 4 was repeated substituting isotactic polybutene-1 (Melt Index 8.0) having the structure

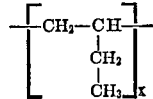

for the low density polyethylene where $x$ can be, for example, 5000. As shown in Table 7, the molecular weight was increased significantly.

TABLE 7

| Sample | Ratio PB-1/PS/MA | Inherent viscosity [1] |
| --- | --- | --- |
| 7a | 120/2/1 | 2.10 |
| 7b | 120/2/– | 1.49 |
| 7c | 120/–/– | 1.38 |

[1] As in Example 1.

As with sample 1a, samples 4a, 6a, and 7a showed a draw behavior represented by high elongation (at least 500%) at high draw rates.

It is believed that the desirable results of the present invention will be obtained with other such polymers having a tertiary hydrogen atom in the monomer unit, i.e. a structure $$\left[ \begin{array}{c} CH_2-CH \\ | \\ R \end{array} \right]_x$$

where R is an alkyl radical.

In terms of the generalized formula for the aromatic compound set forth above, the symbols were defined as follows:

TABLE 8

| Example | n | R₁ | R₂ | R₃ |
| --- | --- | --- | --- | --- |
| 1, 4 to 7 | ca. 10,000 | 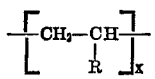 | H | CH₃ |
| 2a | 1 |  | H | H |
| 2b | 1 |  | H | H |
| 2c | 1 | 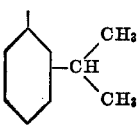 | H |  |

From the above it will be apparent to those skilled in this art that our improved polymers lend themselves to faster and less expensive stretching operations. Thus they are more likely to perform well in blown film or cold-stretch processes than conventional polymers. As such they find utility, for example, in the manufacture of packaging film, films for electrical capacitors, and synthetic papers.

While it is not desired to limit our invention to any particular theory, we believe that the improvement in physical properties results from an increase in molecular weight by a grafting mechanism.

The amounts of maleic anhydride and aromatic compound are not critical, and the ranges of from 0.05 to 5 parts maleic anhydride and from 0.2 to 10 parts of the aromatic compound based on 100 parts of polymer being improved by weight are believed to be useful. Preferred ranges are from 0.05 to 2 parts maleic anhydride and 1 to 5 parts aromatic compound.

The use of maleic anhydride is preferred, but compounds having similar properties such as other organic radical formers may be substituted in equivalent amounts if desired.

Having described our invention by reference to specific examples, it will be apparent to those skilled in this art that modifications may be made without departing from its spirit and scope. Such modifications are intended to form a part of our invention except as it may be limited by the claims which conclude this disclosure.

We claim:

1. Method of improving the extrusion performance and physical properties of polymers selected from the group consisting of isotactic polypropylene, low density polyethylene, ethylene/propylene copolymers, and polybutene-1 which comprises, prior to extrusion, melt-blending with the polymer 0.05 to 5 parts of maleic anhydride and 0.2 to 10 parts of an aromatic compound having the following structure:

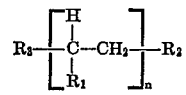

where
   R₁=aromatic radical or substituted aromatic radical having a tertiary hydrogen in the α position to the benzene ring,
   R₂=H₁, or alkyl radical,
   R₃=H₁, alkyl or aromatic radical,
   $n=1-10,000$, said parts being by weight based on 100 parts by weight of polymer.

2. The method of claim 1 wherein the proportions of maleic anhydride are from 0.05 to 2 parts by weight of polymer and the proportion of aromatic compound is from 1 to 5 parts by weight per 100 parts of polymer being improved.

3. The method of claim 1 wherein the aromatic compound is selected from the group consisting of polystyrene, cumene, m-di-isopropylbenzene, and 1,1-diphenylethane.

4. Method of modifying the properties of isotactic polypropylene so as to provide for more rapid extrusion which comprises, blending with said polypropylene an amount of maleic anhydride in the range of from 0.05 to 5 parts based on 100 parts of polypropylene by weight and an amount of a compound selected from the group consisting of polystyrene, cumene, m-di-isopropylbenzene, and 1,1-diphenylethane in the range of from 0.2 to 10 parts based on 100 parts by weight of the polypropylene.

5. Method of improving the extrusion performance and physical properties of isotactic polypropylene which comprises, prior to extrusion, melt-blending with the polypropylene 0.05 to 5 parts of maleic anhydride and 0.2 to 10 parts of polystyrene, said parts being by weight based on 100 parts by weight of polypropylene.

6. A composition comprising 100 parts of a polymer selected from the group consisting of isotactic polypropylene, low density polyethylene, ethylene/propylene copolymers, and polybutene-1, 0.05 to 5 parts of maleic anhydride, and 0.2 to 10 parts of a compound having the structure

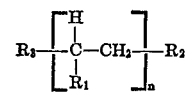

where
   R₁=an aromatic radical or substituted aromatic radical having a tertiary hydrogen in the α position to the benzene ring,
   R₂=H₁, or alkyl radical,
   R₃=H₁, aromatic or alkyl radical, and
   $n=1-10,000$.

7. The composition of claim 6 wherein the compound is selected from the group consisting of polystyrene, cumene, m-di-isopropylbenzene, and 1,1-diphenylethane.

8. A composition comprising, by weight, 100 parts of isotactic polypropylene, 0.05 to 5 parts of maleic anhydride, and 0.2 to 10 parts of polystyrene.

References Cited

UNITED STATES PATENTS

| | | | |
|---|---|---|---|
| 3,018,263 | 8/1962 | Schneider | 260—45.5 |
| 3,092,891 | 6/1963 | Baratti | 28—82 |
| 3,121,070 | 2/1964 | Coover et al. | 260—45.5 |
| 3,301,921 | 1/1967 | Short | 260—878 |

MURRAY TILLMAN, Primary Examiner

C. J. SECCURO, Assistant Examiner

U.S. Cl. X.R.

260—88.2 S, 94.96 D, 96

PO-1050
(5/69)

UNITED STATES PATENT OFFICE
CERTIFICATE OF CORRECTION

Patent No. 3,804,926            Dated April 16, 1974

Inventor(s)  Eckhard C. A. Schwarz and Robert T. Kohl

It is certified that error appears in the above-identified patent and that said Letters Patent are hereby corrected as shown below:

Column 1, last line, "blow" should be -- below --.
Column 2, first line, "blow" should be -- blown --.
Column 2, line 53, "30,0000" should be -- 30,000 --.

Signed and sealed this 17th day of September 1974.

(SEAL)
Attest:

McCOY M. GIBSON JR.
Attesting Officer

C. MARSHALL DANN
Commissioner of Patents